United States Patent

[11] 3,619,675

| [72] | Inventor | Silveus M. Baker<br>Tustin, Calif. |
|---|---|---|
| [21] | Appl. No. | 833,377 |
| [22] | Filed | June 16, 1969 |
| [45] | Patented | Nov. 9, 1971 |
| [73] | Assignee | Royal Industries, Inc.<br>Pasadena, Calif. |

[54] CONTROL ROD DRIVE MECHANISM
7 Claims, 7 Drawing Figs.

[52] U.S. Cl. ................................................. 310/80,
310/83, 176/36
[51] Int. Cl. ............................................... H02k 7/12
[50] Field of Search ............................................ 310/75, 76,
77, 80, 83, 12-14; 176/36

[56] References Cited
UNITED STATES PATENTS

| 2,812,455 | 11/1957 | Noe ........................... | |
|---|---|---|---|
| 2,857,537 | 10/1958 | McCown ..................... | 310/83 |
| 3,162,796 | 12/1964 | Schreiber et al. ............. | 310/83 |
| 3,206,628 | 9/1965 | Korthaus et al. .............. | 310/12 X |
| | | | 310/76 X |

*Primary Examiner*—D. F. Duggan
*Attorney*—Christie, Parker & Hale

ABSTRACT: A control rod drive mechanism for positioning a control rod in a nuclear reactor. The control rod having a part length poison portion for positioning in the reactor core. The mechanism coacting with a pressure housing and including an energizable stator mounted on the outside of the pressure housing and a rotor responsive to the stator mounted on the inside of the pressure housing for positioning a control rod. A rotor tube is movably mounted with a translating leadscrew and positioned within the rotor to be rotatably responsive to the magnetic field coupled thereto from the stator. The part length control rod is connected to the leadscrew and movable therewith. The rotor carries a nut assembly for engagement with the leadscrew to cause the leadscrew to be responsive to the rotations of the rotor and thereby the positioning of the control rod. The rotor is constructed of two pivoted segments adapted to pivot in opposite directions in response to the energization and deenergization of the stator for providing an unlocking and locking action of the rotor by moving one of the segments against the pressure housing to effect the braking action of the rotor and effective for preventing translation of the leadscrew.

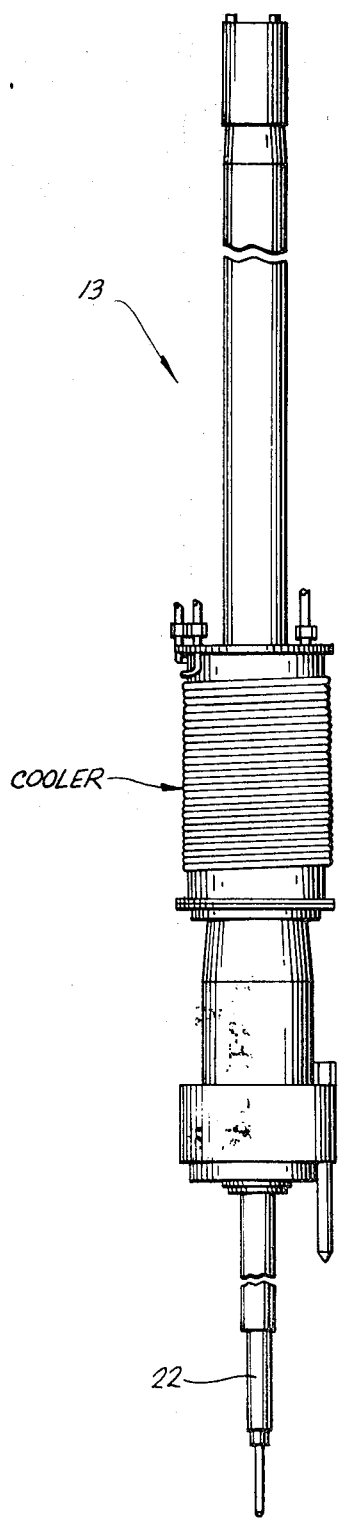
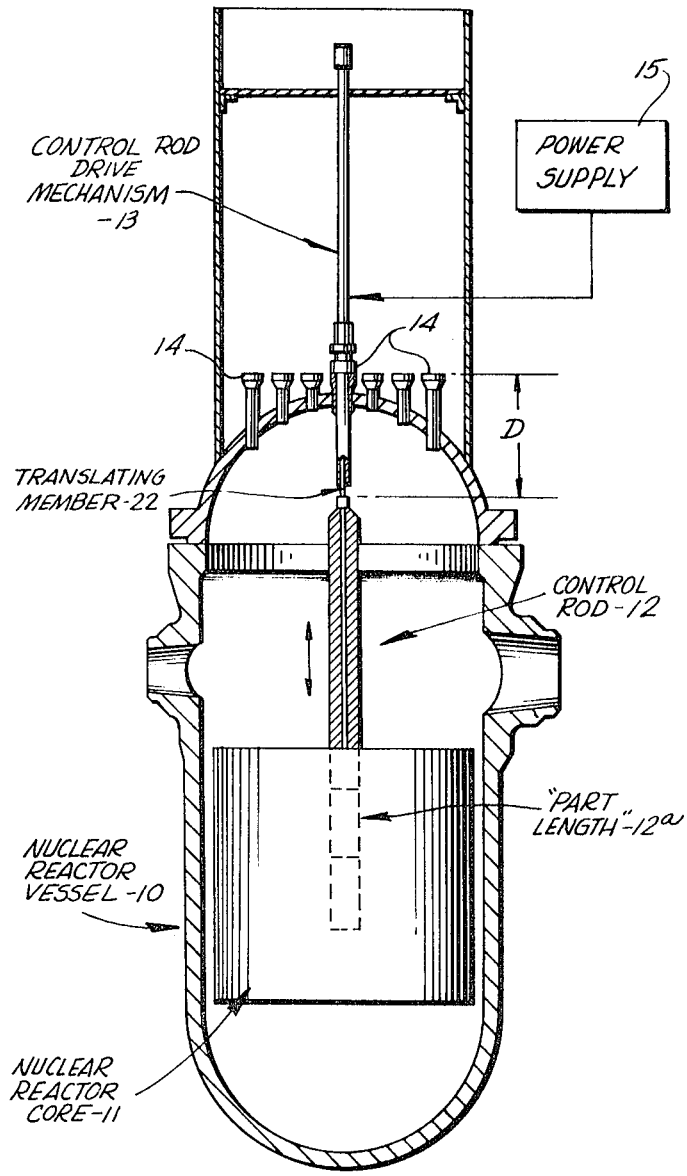

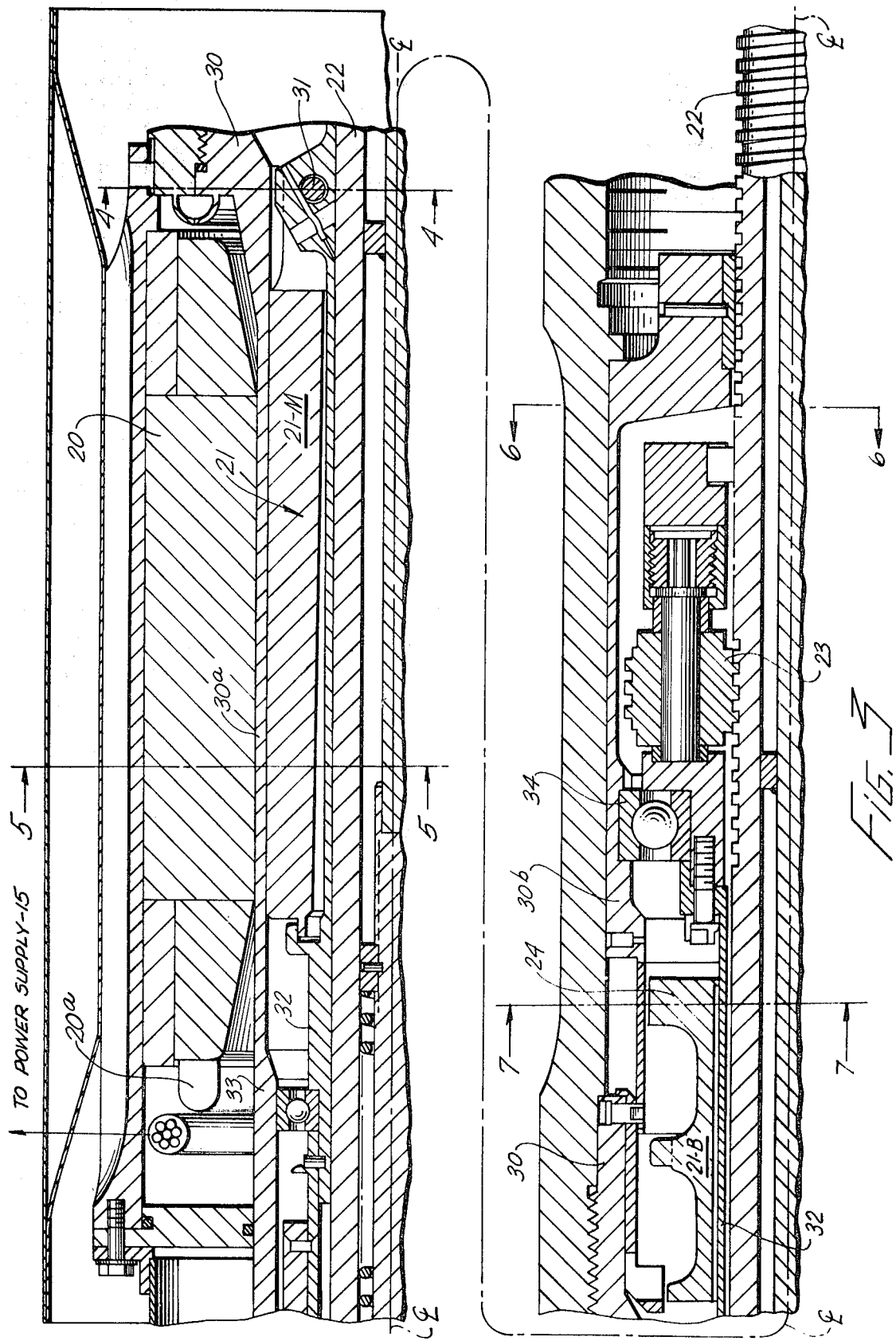

CONTROL ROD DRIVE MECHANISM

This invention relates to a control rod drive mechanism for a nuclear reactor.

Control rod drive mechanisms are utilized in nuclear reactors to control the position of the control rod within the reactor core and thereby control the nuclear reaction. Various types of control rod drive mechanisms have been employed for this purpose. In addition to the actual positioning of the control rod at a desired location within the reactor core, the drive mechanisms are generally operative for moving at control rod in and out of the reactor core at controlled speeds. For example, when the power is lost to the control rod drive mechanism it may be necessary to insert as quickly as possible the control rod into the reactor core to prevent any undesirable reactions as a result of the loss of power. Any control rod drive that affords this action is termed in the art as a "scram" drive mechanism. One such drive is exemplified by the teachings of U.S. Pat. No. 2,857,537. Generally, this type of drive is employed with control rods that have a poison (neutron absorber) section for a substantial portion of the rod so that upon positioning of the rod varying lengths of the poison portion of the rod are immersed in the reactor core thereby varying the nuclear reactivity. Another type of control rod presently employed is termed in the art as a "part length" control rod. The part length control rod is distinguished from the conventional rod in that only a portion of the rod contains poison for controlling the nuclear reaction. This part length control rod has been found to allow for better control over the nuclear reactivity within the reactor core. With this type of control rod, it may not be necessary to provide a "scram" action.

When the type of control rod having a substantial poison portion is under control and power to the drive mechanism is lost or interrupted, the control rod is driven to the end of its travel — "scrammed" as mentioned hereinabove. Since the control rod is defined with a substantial poison section it can be scrammed to prevent undesirable reactions. This cannot be resorted to when a "part length" control rod is employed because it would produce undesirable results. It is therefore desirable to provide some means of maintaining the selected position for the part length control rod in the event power is lost or interrupted to the control rod drive mechanism. This restraining action causes the control rod to stay put or fail safe rather than to "fall in" as a result of the "scramming" fail safe action of the more conventional control rods.

The present invention provides an improved control rod drive mechanism particularly useful with a part length control rod that allows the control rod to be precisely positioned and maintained at all times. In the event of the interruption of the electrical power or the loss of power to the control rod drive mechanism, the mechanism of the present invention is adapted to precisely maintain the position of the control rod at the moment of power loss. The inadvertent in or out motion of the control rod is prevented through the provision of a fail safe braking means having positive coupling to the motion translating member of the control mechanism.

From a broad standpoint the present invention provides a control rod drive mechanism employing a motor having a stator adapted for generating a moving or rotating magnetic field and a rotor coupled to be responsive to the magnetic field for movement or rotation therewith. The rotor assembly carries nut means that are arranged with motion-translating means having a positive connection with the nut means to be responsive to the energization of the stator for translating the motion of the rotor to linear motion for controllably positioning the control rod. This assembly further includes brake means for restraining the translating means when the motor stator is deenergized thereby providing fail safe holding of the position of the control rod. For this purpose the rotor assembly may comprise pivoted segments, with the segments carrying the brake means.

These and other features of the present invention may be more fully appreciated when considered in the light of the following specification and drawings, in which:

FIG. 1 is a diagrammatic cross-sectional view of a nuclear reactor vessel embodying the present invention;

FIG. 2 is a detached view of the control rod drive mechanism illustrated in FIG. 1;

Figure 5:
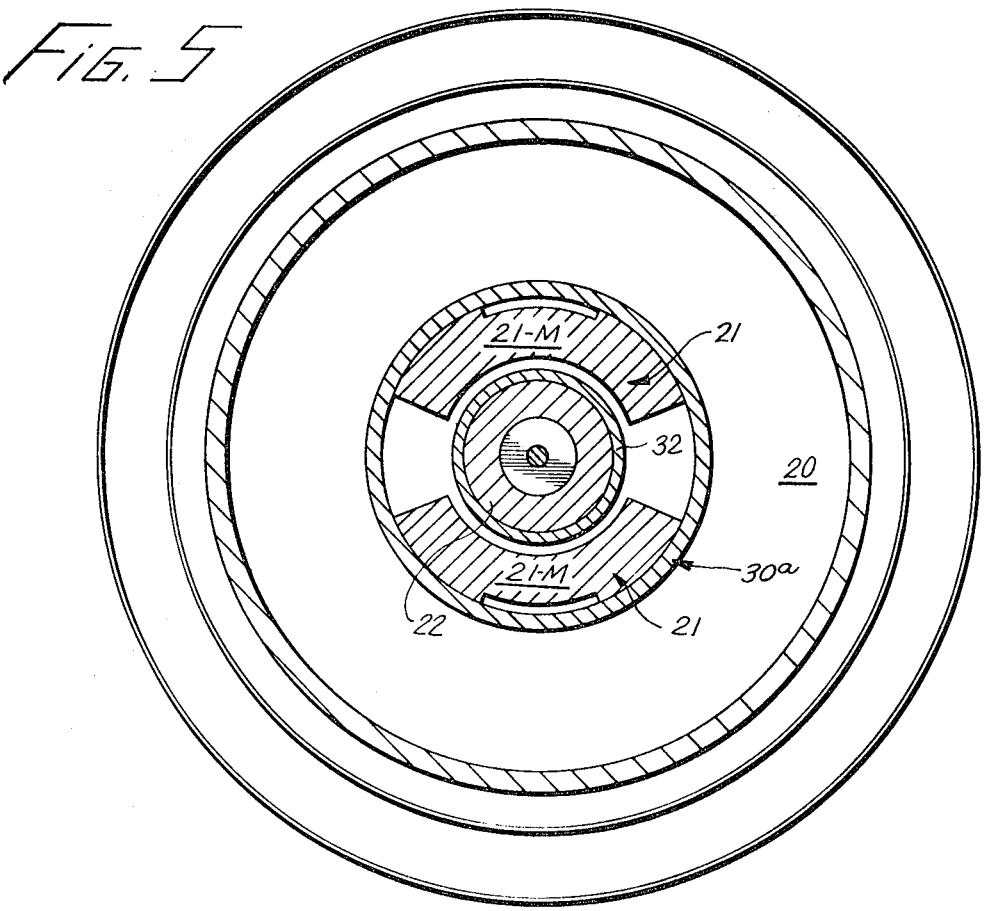
Figure 4:
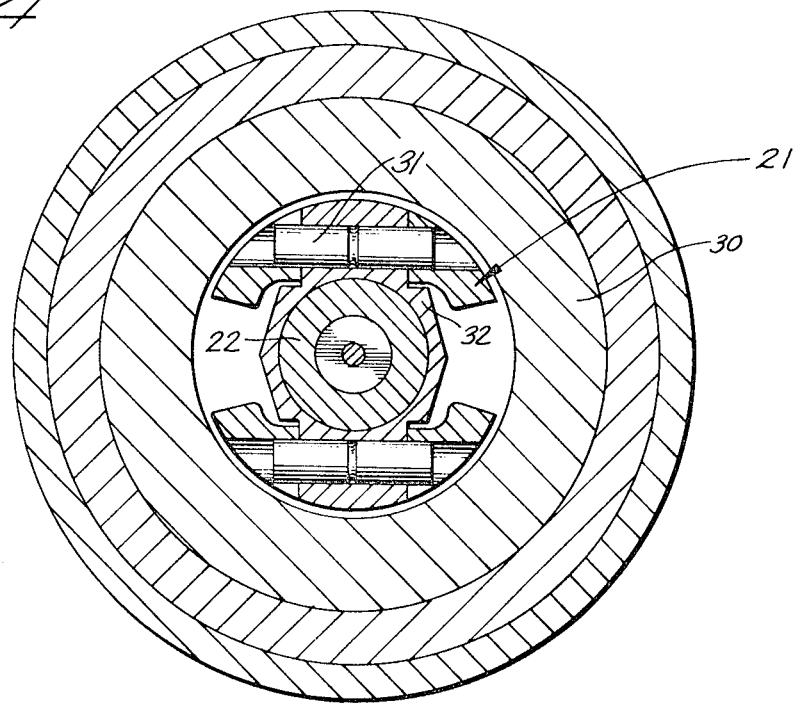
Figure 6:
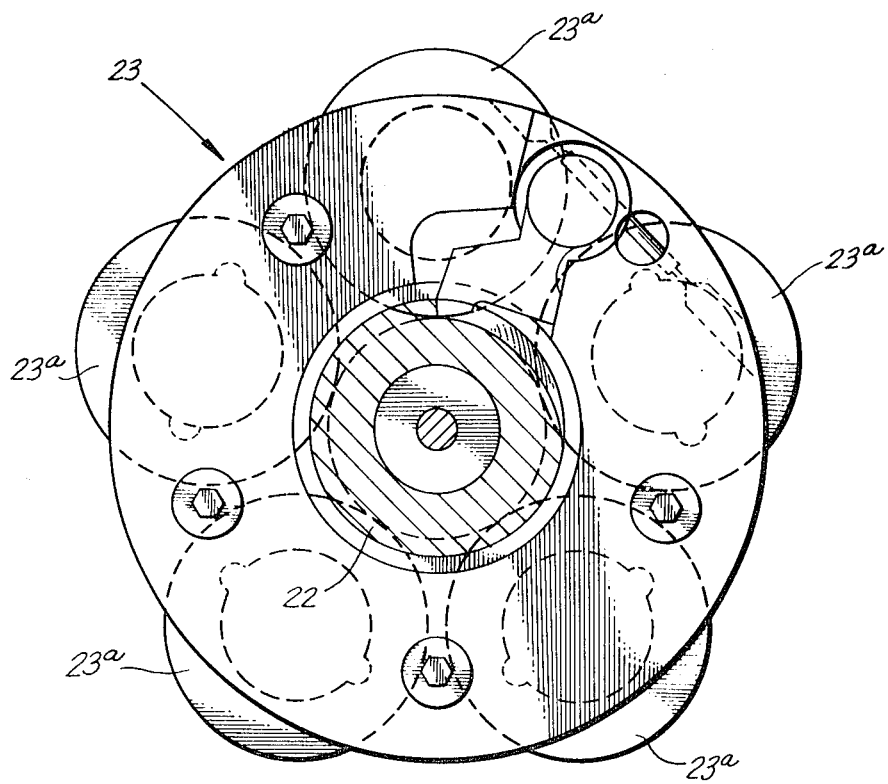
Figure 7:
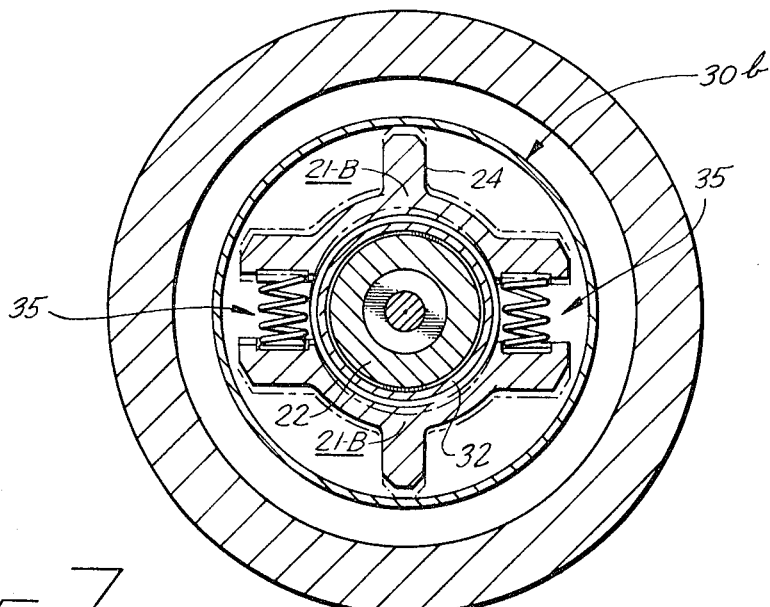

FIG. 3, in its entirety, is a partial cross-sectional view of the control rod drive mechanism of the present invention illustrated on one side of the center line for the mechanism and in an electrically energized condition;

FIG. 4 is a cross-sectional view taken along the line 4—4 of FIG. 3;

FIG. 5 is a cross-sectional view taken along the line 5—5 about the pivot point of the rotor assembly as illustrated in FIG. 3;

FIG. 6 is a cross-sectional view of the roller-nut assembly taken along the line 6—6 of FIG. 3; and FIG. 7 is a cross-sectional view of the braking means taken along the line 7—7 of FIG. 3.

Now referring to FIGS. 1 and 2 the general organization of a conventional nuclear reactor vessel will first be examined. The nuclear reactor vessel is identified by the general reference character 10. The vessel 10 comprises a nuclear reactor core 11 which receives a control rod 12. The control rod 12 is illustrated as a "part length" rod and the poison portion is identified by the reference character $12^z$. The position of the control rod 12 is controlled through the action of the control rod drive mechanism 13 which is axially mounted above the control rod 12. The control rod drive mechanism 13 is connected to the control rod 12 through a nozzle 14 extending outwardly of the reactor vessel 10 proper. Although one control rod drive mechanism 13 is illustrated in association with a single control rod 12, it will be understood that a plurality of such mechanisms are generally employed and will be mounted in the same fashion with the illustrated nozzles of FIG. 1. Each of the other unillustrated control rods 12 will have an independently operated control rod drive mechanism 13 for positioning the control rods into the nuclear reactor core 11 to effect the desired nuclear reaction by positioning the rods 12. As will be evident from FIG. 1, the linear movement of the control rod drive mechanism and thereby the total travel of the control rod 12 is identified in FIG. 1 by the linear distance D," essentially extending between the outer portion of the nozzles 14 and the point of junction between the control rod 12 and the control rod drive mechanism 13. For the purpose of effecting the positioning of the control rod 12, a control rod power supply is generally coupled to the motor for effecting the linear movement of the control rod 12. The power supply is illustrated in FIG. 1 in block form and identified by the reference numeral 15.

Now referring to FIGS. 3 through 5 the detailed construction of the control rod drive mechanism 13 of the present invention will be examined. It will be recalled that the illustration of the control drive mechanism in FIG. 3 is on one side of the centerline and the unillustrated other half is the same as that illustrated. Broadly, the control rod 12 is controlled by the provision of a motor having a stator adapted for generating a moving or rotating magnetic field upon energization of the stator windings for effecting the linear drive action. The moving or rotating magnetic field is coupled to the motor rotor 21 that moves or rotates in response to the magnetic field. The rotor 21 is adapted for controlling a translating means or member shown in the form of a leadscrew 22 connected to the control rod 12. With the energization of the stator 20, the rotation of the rotor 21 causes the translation of the leadscrew 22 as a result of the engagement of a roller nut assembly 23 secured to the rotor and positively connected to the leadscrew 22. In addition, the control rod drive mechanism includes braking means generally identified by the reference numeral 24. It should be recognized that the position of the drive mechanism illustrated in FIGS. 3–7 is the position that corresponds to the intervals when the stator 20 is energized. In this position then the braking means 24 is deenergized from its normal position for providing the braking action. The control rod drive mechanism 13 is mounted with a pressure housing 30 longitudinally extending for enclosing the mechanism. The pressure housing 30 is constructed and defined in the fashion of a sleeve and has a magnetic section 30ᵃ for coupling the magnetic field generated by the motor stator 20 to the rotor 21 therethrough. It should be understood that the motor comprising the stator 20 and the rotor 21 is of a generally conventional construction and may comprise a four-pole, six-phase reluctance type stepping motor. A motor of this type is disclosed in the aforementioned U.S. Pat. No. 2,857,537. For this purpose the motor stator 20 will have an energizable winding 20ᵃ for connection to the power supply 15. The power supply 15 is connected and defined for energizing the stator windings 20ᵃ in the proper sequence for generating a rotating magnetic field. For this purpose the power supply may be a DC power supply wherein two electrical cycles result in one revolution of the rotor 21 and effects the translation of the leadscrew 22 through a preselected fraction of an inch. It will also be appreciated that the direction of the movement or rotation of the magnetic field establishes the direction of the movement or rotation of rotor 21 and thereby the direction of movement of the control rod 12 into and out of the nuclear core 11 whereby the active segment 12ᵃ is positioned in different locations in the reactor core 11. The stator 20 is mounted on the outside of the housing 30 adjacent the magnetic portion 30ᵃ while the rotor 21 is mounted within the pressure housing opposite the stator to be responsive to the rotating magnetic field produced by the stator 20.

The rotor 21 in accordance with the present teachings is of a unitary construction and is considered as being defined in two pivoted segments. One rotor segment is illustrated as the magnetic segment of the rotor 21 and is mounted immediately opposite the stator 20 and is identified by the reference character 21–M. The other rotor segment 21–B is mounted on the opposite side of a pivot pin 31, shown at the right-hand section of the upper portion of FIG. 3, and is identified by the general reference numeral 21–B. This rotor section 21–B, is illustrated in the left-hand portion of the lower section of FIG. 3. The two rotor segments 21–M and 21–B are pivotable about the pin 31 in opposite directions. As illustrated, the rotor section 21–M is in engagement with the rotor tube 32 mounted to be rotatable therewith. The rotor 21 and rotor tube 32 are suspended between a radial bearing 33 and a thrust bearing 34 to be rotatable therebetween. The pressure housing 30 houses the upper portion 21–M of the rotor 21 and serves as a guide for the upper end of the leadscrew 22. The upper end of the rotor tube 32 is adapted for supporting the rotor radial bearing 33 on which the rotor 21 and rotor tube 32 rotate. The rotor segment 21–B includes spring means for moving the rotor segment 21–B or the braking segment towards the housing 30–B fixed to the pressure housing 30 when the stator is deenergized. The spring means are identified by the general reference character 35. The braking element 24 can be adapted for providing an absolute mechanical lock with the adjacent wall of the housing 30–B or can be adapted to provide a frictional lock to the wall of the housing 30–B. The braking position, or the other position from that illustrated in FIG. 3 in response to the urging of the spring means 35 is illustrated in dotted outline in FIG. 7.

The rotor tube 32 encloses the leadscrew 22 arranged coaxial with the rotor tube. The leadscrew 22 is connected with the rotor section 21–B through a roller nut assembly 23. The roller nut assembly 23, as best illustrated in FIG. 6, comprises a plurality (illustrated as five) of roller nuts 23ᵃ in positive engagement with the leadscrew 22. It will be appreciated that the lower end of the leadscrew 22 is coupled to the control rod 12 as illustrated in FIG. 1 so that the translation of the leadscrew as a result of the rotation of the roller assembly 23 effects the desired linear position of the control rod 12.

With the above structure in mind, then, it will be recognized that with the power supply 15 deenergized that the stator 20 will be deenergized and that the rotor 21 will be in a stationary position. With the rotor 21 in a stationary position, the motor segment 21–B will be braked against the inner wall of the housing 30–B as a result of the braking section 21–B being urged thereagainst by the spring means 35. At this same time the roller assembly 23 will positively engage the leadscrew 22 to prevent any movement in either direction of the leadscrew 22. At this time the position of the rotor 21–M will be opposite to that illustrated in FIG. 3, namely, it will be spaced away from the pressure housing 30 and pivoted towards the rotor tube 32. With the energization of the motor stator 20, then, the rotating magnetic field will be generated as a result of the energization of the stator windings. The rotating magnetic field will be coupled through the magnetic portion 30ᵃ of the pressure housing 30 to the rotor magnetic segment 21–M. The rotor segment 21–M will immediately respond to the magnetic field and pivot about the pin 31 towards the stator 20 and away from the rotor tube 32. At this same interval the motor segment 21–B will pivot away from the housing 30–B thereby unlocking the rotor 21 and thereby the leadscrew 22. With the unlocking of the leadscrew 22 and the continuing energization of the stator 20, the rotor 21 will rotate in response to the rotating magnetic field and since the roller nut assembly 23 is carried by the rotor 21, the leadscrew 22 will be moved in accordance with the direction of the rotation of the rotating magnetic field. The leadscrew 22, then, essentially translates the rotary motion of the roller nut assembly 23 into linear motion and thereby linearly positions the control rod 12. With the clockwise rotation of the rotor 21, the leadscrew 22 is driven upwardly or out of the reactor core 11, while the counterclockwise rotation of the rotor 21 will drive the leadscrew 22 into the reactor core 11. It should now be appreciated that if during any positioning of the control rod 12 that the power from the power supply 15 is interrupted or there is a complete loss of power, the rotating magnetic field will suddenly collapse. With the construction of the present invention the position of the leadscrew 22 will be maintained or the leadscrew will stay put. The collapse of the magnetic field will cause the rotor segments 21–M and 21–B to pivot to their normal deenergized position whereby a braking force is applied as a result of the rotor segment 21–B engaging in a braking fashion the housing 30–B in response to the spring means 35. In addition, with the positive contact between the leadscrew 22 and the roller nut assembly 23, the position of the leadscrew is held and maintained until power is reapplied.

I claim

1. In a reactor control rod drive including a pressure housing, a motor stator assembly adapted for producing a rotating magnetic field surrounding the pressure housing, a rotor-nut assembly mounted within the pressure housing, a rotor tube rotatably mounted within the rotor assembly,
   a translating leadscrew mounted within the rotor tube to be responsive to the rotations of the rotor-nut assembly,
   a control rod connected to the leadscrew and moved therewith,
   the improvement comprising a rotor-nut assembly having segments adapted to pivot in opposite directions in response to the energization and deenergization of the stator assembly for providing an unlocking and locking action respectively of the rotor and effective for preventing translation of the leadscrew 2. In a reactor control rod drive as defined in claim 1 including resilient means mounted with one of the rotor segments for moving said segment against said housing to effect the braking action.

3. In a nuclear reactor control rod drive mechanism connectable to a control rod having
   a pressure housing having a magnetic section,
   a motor having an energizable stator and a rotor,
   the stator being adapted for producing a rotating magnetic field and being mounted adjacent the magnetic section of the housing for coupling the magnetic field therethrough,
   a rotatable rotor tube positioned within the rotor,
   the rotor for the motor being mounted inside the pressure housing and rotatably mounted with the rotor tube to be rotatably responsive therewith to the magnetic field coupled thereto, and a translating leadscrew movably mounted within the rotor tube, said rotor carrying a nut assembly for engagement with the leadscrew to cause the leadscrew to be responsive to the rotations of the rotor, the improvement comprising the motor rotor carrying braking means normally braking the rotor when the motor stator is deenergized for holding the translating leadscrew in position and deactuated when the stator is energized.

4. In a nuclear reactor control rod drive mechanism as defined in claim 3 wherein the motor rotor comprises two pivoted segments adapted for pivoting in opposite directions in response to the energization and deenergization of the stator, said braking means being carried by one of said segments.

5. In a nuclear reactor control rod drive mechanism as defined in claim 4 wherein said rotor segments comprise a magnetic segment coupled to the rotating magnetic field and the other segment carrying the braking means, said braking means being constructed and defined to be normally biased in braking position against said housing.

6. In a nuclear reactor control rod drive mechanism as defined in claim 3 wherein said nut assembly comprises a plurality of spaced-apart roller nuts which coact with the improvement to positively engage the leadscrew for holding and maintaining the leadscrew position and thereby the position of the control rod in the event of power interruption or failure of power to the stator.

7. In a nuclear reactor control rod drive mechanism for positioning a control rod having a part length poison portion including a pressure housing, a control rod drive mechanism including a drive motor having an energizable stator mounted on the outside of the pressure housing and a rotor responsive to the stator mounted on the inside of the pressure housing for positioning a control rod, the improvement comprising a motor rotor constructed and defined to be pivotable so that the ends of the rotor are swingable in opposite directions in response to the energization and deenergization of the motor stator, said rotor including means for holding the position of the drive mechanism upon deenergization of the stator in response to the swinging action of the rotor.

* * * * *